(12) United States Patent
Ker et al.

(10) Patent No.: US 10,907,520 B1
(45) Date of Patent: Feb. 2, 2021

(54) SAMPLING DEVICE FOR AN EXHAUST GAS SENSOR

(71) Applicant: Faurecia Emissions Control Technologies, USA, LLC, Columbus, IN (US)

(72) Inventors: Eric Ker, Columbus, IN (US); Philip Dimpelfeld, Columbia, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/659,992

(22) Filed: Oct. 22, 2019

(51) Int. Cl.
*F01N 13/00* (2010.01)
*F01N 3/20* (2006.01)
*F02D 41/14* (2006.01)

(52) U.S. Cl.
CPC ......... *F01N 3/2066* (2013.01); *F01N 13/008* (2013.01); *F02D 41/1439* (2013.01); *F01N 2560/026* (2013.01)

(58) Field of Classification Search
CPC ............. F01N 13/008; F01N 2560/026; F02D 41/1439; F02D 41/146; F02D 41/1461; F02D 41/1463
See application file for complete search history.

(56) References Cited

U.S. PATENT DOCUMENTS

| 8,756,913 | B2 | 6/2014 | Liu et al. |
| 2003/0172741 | A1 | 9/2003 | Busch |
| 2010/0064663 | A1* | 3/2010 | Goya ............... F01N 11/00 60/276 |
| 2013/0213013 | A1 | 8/2013 | Mitchell et al. |
| 2015/0122002 | A1* | 5/2015 | Mackaldener ...... G01M 15/102 73/114.71 |
| 2016/0305297 | A1 | 10/2016 | Wadke et al. |
| 2018/0135496 | A1 | 5/2018 | Yi et al. |

FOREIGN PATENT DOCUMENTS

| CN | 109738598 A | 5/2019 |
| EP | 3431731 A1 | 1/2019 |

* cited by examiner

*Primary Examiner* — Jonathan R Matthias
(74) *Attorney, Agent, or Firm* — Carlson, Gaskey & Olds. P.C.

(57) ABSTRACT

An exhaust system includes an exhaust duct having an internal surface defining an exhaust gas passage extending along an axis. At least one sensor opening is in the exhaust duct and is configured to receive an exhaust gas sensor. A wall is positioned within the exhaust gas passage to extend at least partially around the at least one sensor opening. The wall has an inner wall surface defining an internal volume. A plurality of inlet pipes are in fluid communication with the internal volume, and each inlet pipe extends from a first end open to the internal volume to a second end that is distal from the first end. Each inlet pipe includes a plurality of inlet apertures.

26 Claims, 2 Drawing Sheets

SAMPLING DEVICE FOR AN EXHAUST GAS SENSOR

TECHNICAL FIELD

This disclosure relates generally to a sampling device for an exhaust gas sensor located within an exhaust duct.

BACKGROUND

Vehicles include exhaust systems that utilize catalysts to remove contaminants from engine exhaust gases. One example of such a catalyst is a Selective Catalytic Reduction (SCR) catalyst where nitrogen oxide (NOx) reduction reactions take place in an oxidizing atmosphere. Levels of NOx are reduced using ammonia as a reductant within a catalyst system. A reduction chemical reaction occurs when a reducing agent reacts with NOx to convert the pollutants into nitrogen, water, and small amounts of CO2. A NOx sensor is used to measure residual NOx content of the exhaust gas exiting the SCR catalyst.

SUMMARY

An exhaust system according to an exemplary aspect of the present disclosure includes, among other things, an exhaust duct having an internal surface defining an exhaust gas passage extending along an axis. At least one sensor opening is in the exhaust duct and is configured to receive an exhaust gas sensor. A wall is positioned within the exhaust gas passage to extend at least partially around the at least one sensor opening. The wall has an inner wall surface defining an internal volume. A plurality of inlet pipes are in fluid communication with the internal volume, and each inlet pipe extends from a first end open to the internal volume to a second end that is distal from the first end. Each inlet pipe includes a plurality of inlet apertures.

In a further non-limiting embodiment of the foregoing system, the exhaust duct has a cross-section extending across the axis, and wherein the plurality of inlet pipes extend across the cross-section to guide exhaust gas from different regions of the cross-section toward the at least one sensor opening within the internal volume.

In a further non-limiting embodiment of any of the foregoing systems, the plurality of inlet pipes are angled away from each other at predefined angles.

In a further non-limiting embodiment of any of the foregoing systems, the wall includes at least one inlet opening to direct exhaust flow into the internal volume and at least one outlet opening to direct exhaust flow out of the internal volume.

In a further non-limiting embodiment of any of the foregoing systems, the wall extends completely around the at least one sensor opening.

In a further non-limiting embodiment of any of the foregoing systems, the plurality of inlet pipes comprises at least first, second, and third inlet pipes.

In a further non-limiting embodiment of any of the foregoing systems, the first inlet pipe has a first pipe axis that extends at a first angle to the axis, wherein the second inlet pipe is positioned on one side of the first inlet pipe and has a second pipe axis that is at second angle relative to the first pipe axis, and wherein the third inlet pipe is positioned on an opposite side of the first inlet pipe and has a third pipe axis that is at a third angle relative to the first pipe axis.

An exhaust system, according to yet another exemplary aspect of the present disclosure includes, among other things, an exhaust duct defining an exhaust gas passage extending along an axis and having a cross-section extending across the axis. The exhaust duct includes at least one sensor opening, and a NOx sensor is mounted within the sensor opening and extends to a sensor tip that is within the exhaust gas passage. A wall is positioned within the exhaust gas passage to extend at least partially around the sensor tip, with the wall having an inner wall surface defining an internal volume. A plurality of inlet pipes are in fluid communication with the internal volume, and each inlet pipe extends from a first end open to the internal volume to a second end that is distal from the first end. Each inlet pipe includes a plurality of inlet apertures.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
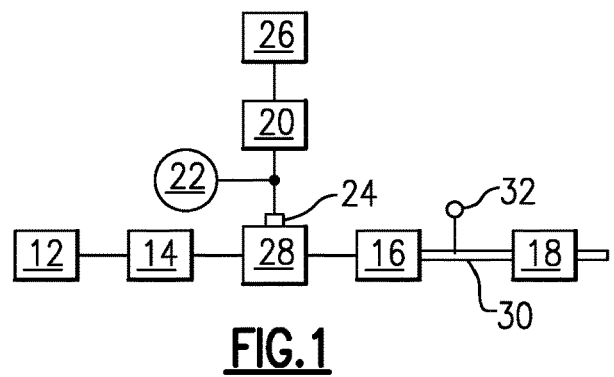
FIG. 1 illustrates a schematic view of a vehicle exhaust system.

This disclosure details an exemplary sampling device that directs exhaust gas toward a sensor tip located within an exhaust duct. FIG. 1 shows a vehicle exhaust system 10 that conducts hot exhaust gases generated by an engine 12 through various upstream exhaust components 14 to reduce emission and control noise as known. In one example configuration, the upstream exhaust component 14 can comprise a diesel oxidation catalyst (DOC) and/or a diesel particulate filter (DPF) that is used to remove contaminants from the exhaust gas as known. Downstream of these upstream exhaust components 14 is one or more additional exhaust gas aftertreatment components 16 that also remove contaminants from the exhaust gas as known. Exhaust gases exiting the exhaust gas aftertreatment components 16 are conducted to downstream exhaust components 18 such as resonators, mufflers, etc., and eventually exit to atmosphere. These upstream 14 and downstream 18 components can be mounted in various different configurations and combinations dependent upon vehicle application and available packaging space.

In one example configuration, an injection system 20 is used to inject a reducing agent, such as a solution of urea and water for example, into the exhaust gas stream upstream from the exhaust gas aftertreatment components 16. The injection system 20 includes a fluid supply 22, a doser/injector 24, and a controller 26 that controls injection of the urea as known. An optional mixer 28 can also be positioned upstream of the exhaust gas aftertreatment components 16 such that the mixer 28 can mix the injected reducing agent and exhaust gas thoroughly together prior to entering the exhaust gas aftertreatment components 16.

In one example configuration, the exhaust gas aftertreatment component 16 comprises at least one Selective Catalytic Reduction (SCR) catalyst where the reducing agent reacts with NOx to convert the pollutants into nitrogen, water, and small amounts of CO2. Exhaust gas exiting the SCR catalyst enters an exhaust pipe or duct 30 and an exhaust gas sensor 32, e.g. a NOx sensor, is used to measure residual NOx content of the exhaust gas exiting the SCR catalyst. The structure and operation of the NOx sensor 32 is known, and any type of NOx sensor can be used to measure the residual NOx content of the exhaust gas.

Figure 3:
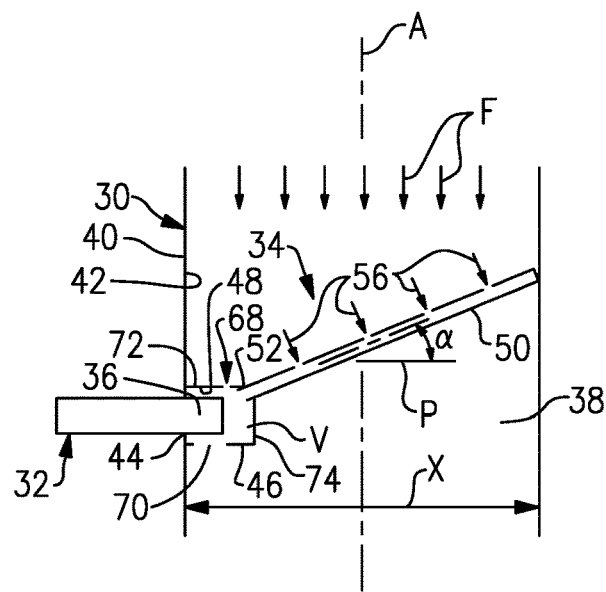
FIG. 3 is a schematic side view of the sampling device of FIG. 2A but only showing one inlet pipe for purposes of clarity.

As shown in FIGS. 2A-4, a sampling device 34 is used to direct exhaust gas toward a sensor tip 36 located within the exhaust duct 30. As shown in FIG. 3, the exhaust duct 30 defines an exhaust gas passage 38 extending along an axis A and having a cross-section X extending across the axis A. The exhaust duct 30 has an external surface 40 and an internal surface 42 that defines the exhaust gas passage 38. The exhaust duct 30 has at least one sensor opening 44 that extends through a wall thickness of the exhaust duct 30 from the external surface 40 to the internal surface 42.

The NOx sensor 32 is mounted within the sensor opening 44 and extends to the sensor tip 36 that is positioned within the exhaust gas passage 38. A wall 46 is positioned within the exhaust gas passage 38 to extend at least partially around the sensor opening 44 and the sensor tip 36. In one example, the wall 46 extends completely around the sensor opening 44 and the sensor tip 36. The wall has an inner wall surface 48 defining an internal volume V (FIG. 3). A plurality of inlet pipes 50 are in fluid communication with the internal volume V. Each inlet pipe 50 extends from a first end 52, which is open to the internal volume V, to a second end 54 that is distal from the first end 52. Each inlet pipe 50 includes a plurality of inlet apertures 56. In one example, the inlet apertures 56 are spaced apart from each other along a length of the inlet pipes 50. In one example, the inlet apertures 56 face upstream to receive the exhaust flow F and a downstream side of the inlet pipes 50 are free from apertures. The inlet apertures 56 receive the exhaust flow F and direct the exhaust gas up the pipe 50 toward the internal volume V.

The cross-section of the exhaust duct 30 defines a plane P that is perpendicular to the axis A (FIG. 3). In one example shown in FIG. 3, one or more of the plurality of inlet pipes 50 extend at an angle α that is transverse to the plane P. Only one inlet pipe 50 is shown in FIG. 3 for purposes of clarity. In one example shown in FIG. 4, the plurality of inlet pipes 50 are angled away from each other at predefined angles β1, β2. The angles β1, β2 can be the same angles, or the angles β1, β2 can be different from each other.

Figure 4:
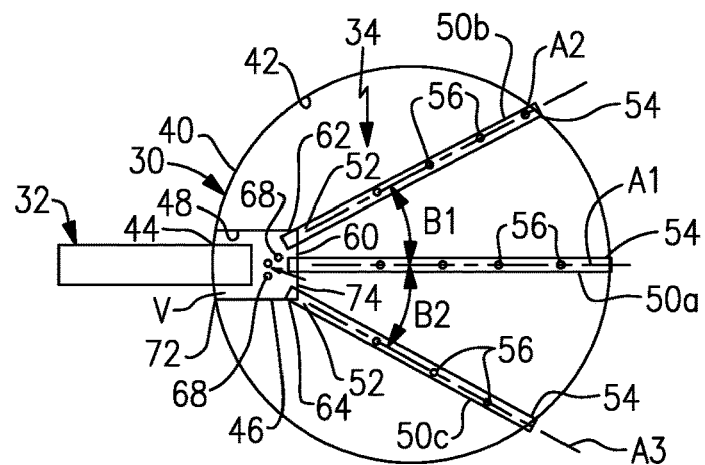
FIG. 4 is a schematic upstream end view of the sampling device of FIG. 2.

In one example, the plurality of inlet pipes 50 comprises at least a first inlet pipe 50a, a second inlet pipe 50b, and a third inlet pipe 50c as shown in FIG. 4. In this example, the first inlet pipe 50a has a first pipe axis A1 that extends at an angle α (FIG. 3) to the central axis A of the exhaust duct 30. The second inlet pipe 50b is positioned on one side of the first inlet pipe 50a and has a second pipe axis A2 that is at first angle β1 relative to the first pipe axis A1. The third inlet pipe 50c is positioned on an opposite side of the first inlet pipe 50a and has a third pipe axis A3 that is at a second angle β2 relative to the first pipe axis A1. In one example, the first β1 and second β2 angles are oblique angles relative to the first pipe axis A1.

Each of the inlet pipes 50 has a length that extends from the first end 52 to the second end 54. The lengths can be the same or different from each other. In one example, each of the inlet pipes is connected to the wall 46 at a discrete location. As such, the first end 52 of the first inlet pipe 50a is in fluid communication with the internal volume V via a first wall opening 60, the first end 52 of the second inlet pipe 50b is in fluid communication with the internal volume V via a second wall opening 62, and the first end 52 of the third inlet pipe 50c is in fluid communication with the internal volume V via a third wall opening 64. The openings 60, 62, 64 are separate from each other as shown in FIG. 4. In one example, each of the inlet pipes 50a, 50b, 50c have lengths that extend across the entirety of the cross-section X from the first end 52 at the wall 46 to the second end 54 at the internal surface 42 of the exhaust duct 30 opposite from the wall 46. This ensures more complete sampling across the entire section of the exhaust duct 30.

Figure 2A:
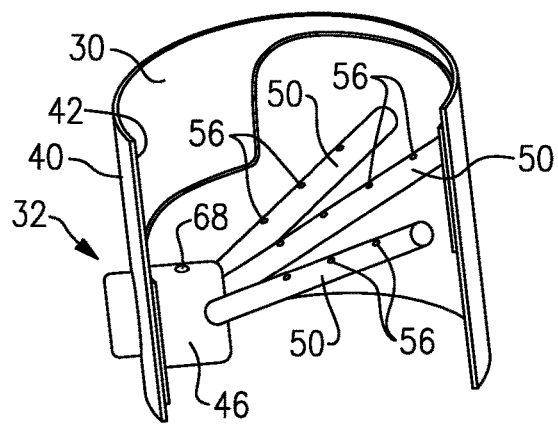
FIG. 2A is a perspective view of a sampling device with a plurality of inlet pipes as used in the system of FIG. 1.
Figure 2B:
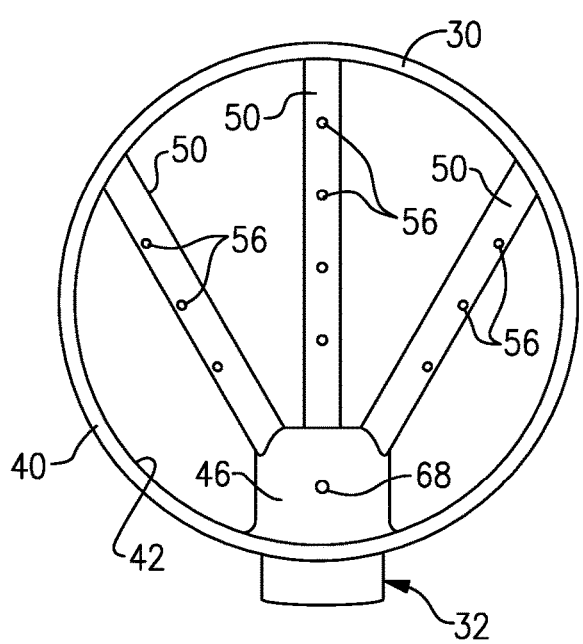
FIG. 2B is an inlet end view of the sampling device of FIG. 2A.
Figure 2C:
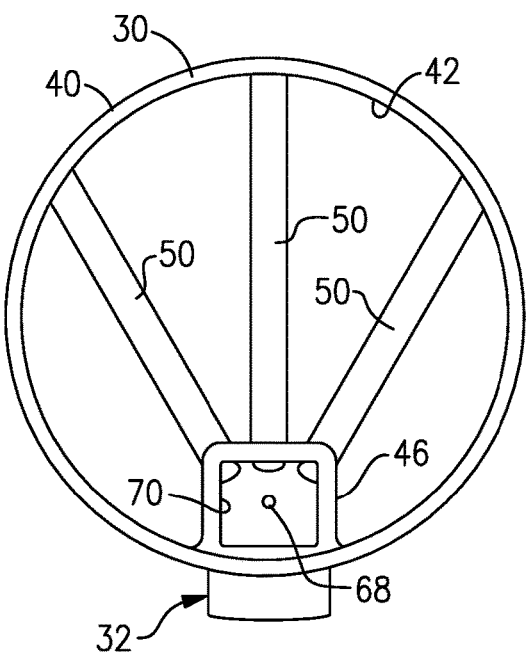
FIG. 2C is an outlet end view of the sampling device of FIG. 2A.

The wall 46 includes at least one inlet opening 68 (FIG. 2B) to direct exhaust flow into the internal volume V and at least one outlet opening 70 (FIG. 2C) to direct exhaust flow out of the internal volume V. In one example, the inlet opening 68 is smaller in cross-sectional area than the outlet opening 70. FIG. 4, which shows an upstream side of the sampling device 34, shows an example with multiple inlet openings 68. FIGS. 2A-2B show an example where there is only one inlet opening 68 and only one outlet opening 70.

In one example, the wall 46 has an open end 72 that is connected directly to the internal surface 42 of the exhaust duct 30 around the sensor opening 44. An opposite end 74 of the wall 46 comprises an enclosed end. The wall 46 extends between the ends 72, 74 completely about the sensor opening 44 and tip 36, i.e. the wall 46 extends three hundred and sixty degrees about the tip 36. The openings 60, 62, 64 for the inlet tubes 50a, 50b, 50c can be formed within the wall or the enclosed end. The inlet openings 68 are formed in the upstream side of the wall 46 and the outlet opening 70 is formed in the downstream side of the wall 46. The wall 46 is shaped to receive the exhaust gas flow exiting from the inlet tubes 50 into the internal volume V and facilitate guiding this input flow and the exhaust gas entering the inlet openings 68 past the sensor tip 36, and then to the outlet opening 70.

In one example, the sampling device 34 is made from a stamping; however, other methods can also be used to form the device.

The sampling device 34 extends the plurality of inlet pipes 50 across the cross-section X to guide exhaust gas from different regions of the cross-section X into the internal volume V and toward the sensor tip 36. This improves exhaust gas sampling accuracy, as the sensor 32 is measuring residual NOx content that is representative of all of the exhaust gas in the exhaust gas stream and not just the exhaust gas that is close to the sensor tip 36. At least three inlet pipes 50 are preferred to provide the desired sampling accuracy; however, additional inlet pipes could be added if needed.

The sampling device 34 is easy to manufacture and install, and is more cost efficient compared to prior designs. Further, the sampling device 34 can be easily installed within existing systems without major changes. While the sampling device is shown as being used with a NOx sensor, it should be understood that it could be used with other types of exhaust gas sensors.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An exhaust system comprising:
an exhaust duct having an external surface and an internal surface defining an exhaust gas passage extending along an axis, and wherein the exhaust duct has a wall thickness extending from the external surface to the internal surface;
at least one sensor opening in the exhaust duct that extends through the wall thickness and that is configured to receive an exhaust gas sensor;
a wall extending radially inward from the internal surface toward the axis and positioned within the exhaust gas passage to extend at least partially around the at least one sensor opening, the wall having an inner wall surface defining an internal volume; and
a plurality of inlet pipes in fluid communication with the internal volume, wherein each inlet pipe extends from a first end open to the internal volume to a second end that is distal from the first end, and wherein each inlet pipe includes a plurality of inlet apertures.

2. The exhaust system according to claim 1 wherein the exhaust duct has a cross-section extending across the axis, and wherein at least one of the plurality of inlet pipes extends across the axis to guide exhaust gas from different regions of the cross-section toward the at least one sensor opening within the internal volume.

3. The exhaust system according to claim 2 wherein the cross-section of the exhaust duct defines a plane that is perpendicular to the axis, and wherein one or more of the inlet pipes extend at an angle that is transverse to the plane.

4. The exhaust system according to claim 1 wherein the second ends of the plurality of inlet pipes are spaced apart from each other.

5. The exhaust system according to claim 1 wherein the plurality of inlet pipes are angled away from each other at predefined angles.

6. The exhaust system according to claim 1 wherein the wall includes at least one inlet opening to direct exhaust flow into the internal volume and at least one outlet opening to direct exhaust flow out of the internal volume.

7. The exhaust system according to claim 6 wherein the wall extends completely around the at least one sensor opening.

8. The exhaust system according to claim 1 wherein the plurality of inlet pipes comprises at least first, second, and third inlet pipes.

9. The exhaust system according to claim 8 wherein the first inlet pipe has a first pipe axis that extends at a first angle to the axis, wherein the second inlet pipe is positioned on one side of the first inlet pipe and has a second pipe axis that is at second angle relative to the first pipe axis, and wherein the third inlet pipe is positioned on an opposite side of the first inlet pipe and has a third pipe axis that is at a third angle relative to the first pipe axis.

10. The exhaust system according to claim 9 wherein the first, second, and third angles are oblique angles.

11. The exhaust system according to claim 1 wherein the at least one sensor comprises a NOx sensor.

12. The exhaust system according to claim 1 wherein the wall has an open end that is connected directly to the internal surface of the exhaust duct around the sensor opening and extends in a direction toward the axis to an opposite end of the wall that comprises an enclosed end that faces the axis, and wherein the wall extends between the open and enclosed ends completely about the sensor opening.

13. The exhaust system according to claim 1 wherein the wall includes at least one inlet opening to direct exhaust flow into the internal volume and at least one outlet opening to direct exhaust flow out of the internal volume, and wherein the at least one inlet and at least one outlet openings are separate from openings to the internal volume at the first ends of the plurality of inlet pipes.

14. The exhaust system according to claim 13 wherein the at least one inlet opening is smaller in cross-sectional area than the at least one outlet opening.

15. An exhaust system comprising:
an exhaust duct having an external surface and an internal surface defining an exhaust gas passage extending along an axis and having a cross-section extending across the axis, and wherein the exhaust duct has a wall thickness extending from the external surface to the internal surface, and wherein the exhaust duct includes at least one sensor opening extending through the wall thickness;
a NOx sensor mounted within the sensor opening and extending to a sensor tip that is within the exhaust gas passage;
a wall extending radially inward from the internal surface toward the axis and positioned within the exhaust gas passage to extend at least partially around the sensor tip, the wall having an inner wall surface defining an internal volume; and
a plurality of inlet pipes in fluid communication with the internal volume, wherein each inlet pipe extends from a first end open to the internal volume to a second end that is distal from the first end, and wherein each inlet pipe includes a plurality of inlet apertures.

16. The exhaust system according to claim 15 wherein the cross-section of the exhaust duct defines a plane that is perpendicular to the axis, and wherein one or more of the plurality of inlet pipes extend at an angle that is transverse to the plane.

17. The exhaust system according to claim 15 wherein the plurality of inlet pipes are angled away from each other at predefined angles.

18. The exhaust system according to claim 15 wherein the plurality of inlet pipes comprises at least first, second, and third inlet pipes.

19. The exhaust system according to claim 18 wherein the first inlet pipe has a first pipe axis that extends at a first angle to the axis, wherein the second inlet pipe is positioned on one side of the first inlet pipe and has a second pipe axis that is at second angle relative to the first pipe axis, and wherein the third inlet pipe is positioned on an opposite side of the first inlet pipe and has a third pipe axis that is at a third angle relative to the first pipe axis.

20. The exhaust system according to claim 19 wherein the first, second, and third angles are oblique angles.

21. The exhaust system according to claim 15 wherein the wall includes at least one inlet opening to direct exhaust flow into the internal volume and at least one outlet opening to direct exhaust flow out of the internal volume.

22. The exhaust system according to claim 21 wherein the wall extends completely around the sensor tip.

23. The exhaust system according to claim 15 wherein the plurality of inlet pipes extend across the axis to guide exhaust gas from different regions of the cross-section into the internal volume and toward the sensor tip.

24. The exhaust system according to claim 15 wherein the wall has an open end that is connected directly to the internal surface of the exhaust duct around the sensor opening and extends in a direction toward the axis to an opposite end of the wall that comprises an enclosed end that faces the axis, and wherein the wall extends between the open and enclosed ends completely about the sensor opening.

25. The exhaust system according to claim 15 wherein the wall includes at least one inlet opening to direct exhaust flow into the internal volume and at least one outlet opening to direct exhaust flow out of the internal volume, and wherein the at least one inlet and at least one outlet openings are separate from openings to the internal volume at the first ends of the plurality of inlet pipes.

26. The exhaust system according to claim 25 wherein the at least one inlet opening is smaller in cross-sectional area than the at least one outlet opening.

\* \* \* \* \*